United States Patent
Greene et al.

(10) Patent No.: US 10,031,831 B2
(45) Date of Patent: Jul. 24, 2018

(54) DETECTING CAUSES OF PERFORMANCE REGRESSION TO ADJUST DATA SYSTEMS

(71) Applicant: International Business Machines Corporation, Armonk, NY (US)

(72) Inventors: Lawrence A. Greene, Plainville, MA (US); Eric A. Jacobson, Arlington, MA (US); Yong Li, Newton, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 14/694,022

(22) Filed: Apr. 23, 2015

(65) Prior Publication Data

US 2016/0314056 A1 Oct. 27, 2016

(51) Int. Cl.
G06F 11/00 (2006.01)
G06F 11/36 (2006.01)
G06F 11/34 (2006.01)

(52) U.S. Cl.
CPC .......... *G06F 11/3612* (2013.01); *G06F 11/34* (2013.01); *G06F 11/3664* (2013.01); *G06F 11/3688* (2013.01)

(58) Field of Classification Search
CPC ... G06F 11/36; G06F 11/3612; G06F 11/3664
See application file for complete search history.

(56) References Cited

U.S. PATENT DOCUMENTS

| | | | |
|---|---|---|---|
| 7,412,509 B2 | 8/2008 | Murase et al. | |
| 7,757,214 B1 * | 7/2010 | Palczak | G06F 9/5083 709/223 |
| 7,895,565 B1 * | 2/2011 | Hudgons | G06F 11/3684 717/106 |
| 8,325,618 B2 | 12/2012 | Goossens et al. | |
| 8,364,460 B2 | 1/2013 | Ostermeyer et al. | |
| 8,645,769 B2 | 2/2014 | Hasegawa | |
| 8,676,530 B2 | 3/2014 | Roth et al. | |
| 9,195,563 B2 * | 11/2015 | Scarpelli | G06F 11/3495 |

(Continued)

FOREIGN PATENT DOCUMENTS

| | | |
|---|---|---|
| WO | 2013078269 | 5/2013 |
| WO | 2014088398 | 6/2014 |

OTHER PUBLICATIONS

Rothermel et al., "Analyzing Regression Test Selection Techniques", IEEE Transactions on Software Engineering, vol. 22, No. 8, Aug. 1996, pp. 529-551.

(Continued)

*Primary Examiner* — Joshua P Lottich
(74) *Attorney, Agent, or Firm* — Susan Murray; Edell, Shapiro & Finnan, LLC

(57) ABSTRACT

At least one application in a computing environment is executed and one or more performance metrics of the application are measured. The measured performance metrics are analyzed and an operational performance regression is detected. The detected operational performance regression is correlated with one or more recorded changes and the correlated changes are identified as a cause of the operational performance regression. The elements of the computing environment are alerted in accordance with the identified changes to adjust operational performance.

14 Claims, 7 Drawing Sheets

(56) References Cited

U.S. PATENT DOCUMENTS

| | | | |
|---|---|---|---|
| 9,288,074 B2* | 3/2016 | Stern | H04L 12/4641 |
| 9,329,980 B2* | 5/2016 | Baril | G06F 11/3688 |
| 9,876,673 B2* | 1/2018 | Margalit | H04L 41/0631 |
| 2001/0044844 A1 | 11/2001 | Takei | |
| 2004/0060044 A1* | 3/2004 | Das | G06F 8/65 |
| | | | 717/171 |
| 2005/0166094 A1* | 7/2005 | Blackwell | G06F 11/3664 |
| | | | 714/38.14 |
| 2006/0072583 A1 | 4/2006 | Sanda et al. | |
| 2007/0011334 A1* | 1/2007 | Higgins | G06F 11/3604 |
| | | | 709/227 |
| 2007/0061626 A1 | 3/2007 | Nelson et al. | |
| 2008/0306721 A1* | 12/2008 | Yang | G06F 11/261 |
| | | | 703/14 |
| 2009/0055805 A1* | 2/2009 | Dow | G06F 11/3664 |
| | | | 717/128 |
| 2010/0005341 A1 | 1/2010 | Agarwal et al. | |
| 2011/0222432 A1 | 9/2011 | Westerberg et al. | |
| 2012/0079456 A1* | 3/2012 | Kannan | G06F 8/77 |
| | | | 717/124 |
| 2012/0233128 A1* | 9/2012 | Solmer | G06K 9/00442 |
| | | | 707/661 |
| 2012/0254414 A1* | 10/2012 | Scarpelli | G06F 11/3495 |
| | | | 709/224 |
| 2013/0332430 A1* | 12/2013 | Margalit | G06F 11/3476 |
| | | | 707/695 |
| 2014/0013307 A1* | 1/2014 | Hansson | G06F 11/3692 |
| | | | 717/124 |
| 2014/0040869 A1 | 2/2014 | Park et al. | |
| 2014/0310564 A1* | 10/2014 | Mallige | G06F 11/0781 |
| | | | 714/47.1 |
| 2014/0324862 A1 | 10/2014 | Bingham et al. | |
| 2015/0020049 A1 | 1/2015 | Caufield et al. | |
| 2015/0254151 A1* | 9/2015 | Baril | G06F 11/3003 |
| | | | 702/182 |
| 2015/0254161 A1* | 9/2015 | Baril | G06F 11/3616 |
| | | | 717/124 |
| 2015/0254162 A1* | 9/2015 | Baril | G06F 11/3636 |
| | | | 717/128 |
| 2015/0254163 A1* | 9/2015 | Baril | G06F 11/3636 |
| | | | 714/38.1 |
| 2015/0254165 A1* | 9/2015 | Baril | G06F 11/3676 |
| | | | 714/38.1 |
| 2015/0381409 A1* | 12/2015 | Margalit | H04L 41/0631 |
| | | | 709/221 |

OTHER PUBLICATIONS

U.S. Appl. No. 14/475,707, filed Sep. 3, 2014.

\* cited by examiner

DETECTING CAUSES OF PERFORMANCE REGRESSION TO ADJUST DATA SYSTEMS

BACKGROUND

1. Technical Field

Present invention embodiments relate to monitoring performance regression of systems, and more specifically, to monitoring performance regression and identifying a cause of the regression to adjust data integration systems.

2. Discussion of the Related Art

Performance analysis is an important aspect of any critical information integration system. However, as integration systems evolve, it becomes very difficult to analyze performance regression over time. In many situations, performance degradation does not occur over the course of one day or one change set but, instead, performance degradation occurs gradually over the course of the project life cycle. Moreover, performance degradation may occur due to many factors, such as intentional or unintentional debugging statements that should be turned off or removed, algorithm changes, architecture changes, operating environment changes etc. Poor application performance may cause delays, outages, and in some cases, services level agreement problems. In extreme cases, poor application performance may cause integration software to hang or otherwise stop working, which may require a systems administrator and/or operational personnel to monitor the system and take corrective actions.

In many cases, there is no simple manner or operation for detecting performance regression for data integration systems. Consequently, systems administrators regularly perform ad hoc analysis and if the system is not performing well, they will begin to change various system parameters, such as IO buffers, disks, network configuration, memory configuration etc., hoping to find ways to improve system performance. In other words, systems administrators frequently run random experiments or tests in order to try to find a way to improve a degraded system. Sometimes this is useful, but for most systems, this is a very ineffective and time consuming exercise.

SUMMARY

According to one embodiment of the present invention, at least one application in a computing environment is executed and one or more performance metrics of the application are measured. The measured performance metrics are analyzed and an operational performance regression is detected. The detected operational performance regression is correlated with one or more recorded changes and the correlated changes are identified as a cause of the operational performance regression. The elements of the computing environment are alerted in accordance with the identified changes to adjust operational performance.

BRIEF DESCRIPTION OF THE SEVERAL VIEWS OF THE DRAWINGS

Generally, like reference numerals in the various figures are utilized to designate like components.

DETAILED DESCRIPTION

Figure 1:
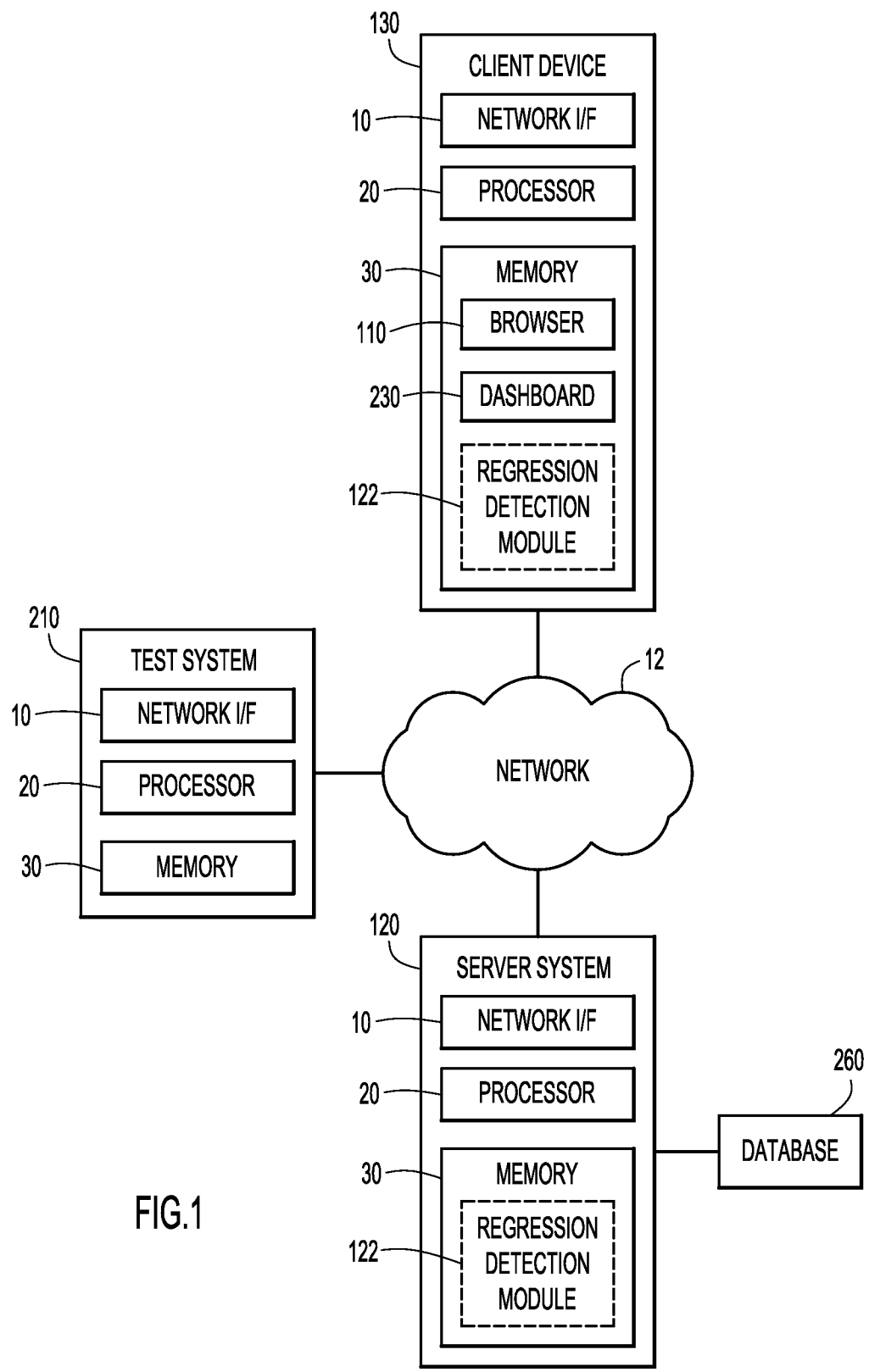
FIG. 1 illustrates an example environment in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Generally referring to the FIGS. 1-7, present invention embodiments are configured to run test jobs for a computing or other system in a controlled order at a scheduled time interval (daily, weekly, or monthly), retrieve any changes to the system between performance runs, detect the nature of any performance regression, and correlate performance regression with actual changes. When the test jobs are run, performance data may be collected, compared, and analyzed based on performance analytical rules in order to detect any performance regression. The performance regression may be related to at least one of: a job design, a run time environment, and an operating system and may be caused by at least one of a data volume, an environment variables, an execution score, a compiler option, and a system configuration. Present invention embodiments may resolve job performance regression issues before they can largely impact the stability, trust, and quality of a data integration or other computing environment.

An example environment for use with present invention embodiments is illustrated in FIG. 1. Specifically, the environment includes one or more databases 260, one or more server systems 120, one or more client or end-user systems 130, and one or more test systems 210. Databases 260, server systems 120, client systems 130, and test systems 210 may be remote from each other and communicate over a network 12. Network 12 may be implemented by any number of any suitable communications media (e.g., wide area network (WAN), local area network (LAN), Internet, intranet, etc.). Alternatively, any number of databases 260, server systems 120, client systems 130 and/or test systems 210 may be local to each other, and communicate via any appropriate local communication medium (e.g., local area network (LAN), hardwire, wireless link, intranet, etc.). A database 260 may be implemented by any conventional information storage system (e.g., database, file system server, etc.).

A server system 120 may include a regression detection module 122. The regression detection module 122 may be implemented across plural server systems. Alternatively, the regression detection module 122, or at least a portion thereof, may reside on a client system 130 for use with a browser 110 or at least one other interface of the client system 130. Client systems 130 enable users to communicate with the server system 120 (e.g., via network 12). The client systems 130 may present any graphical user interface (e.g., GUI, etc.) or other interface (e.g., command line prompts, menu screens, etc.) to receive commands from users and interact with the regression detection module 122 and/or other modules or services. For example, and as is described below in more detail, the client systems 130 may present an interface (e.g., dashboard 230) configured to allow a user to monitor the performance, status, progress, etc. of the regression detection module 122.

Server systems 120, client systems 130, and test systems 210 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software.

The regression detection module 122 may include one or more modules or units to perform the various functions of present invention embodiments described below. The regression detection module 122 may be implemented by any combination of any quantity of software and/or hardware modules or units, and/or may reside within memory 30 of one or more server and/or client systems for execution by processor 20.

Figure 2:
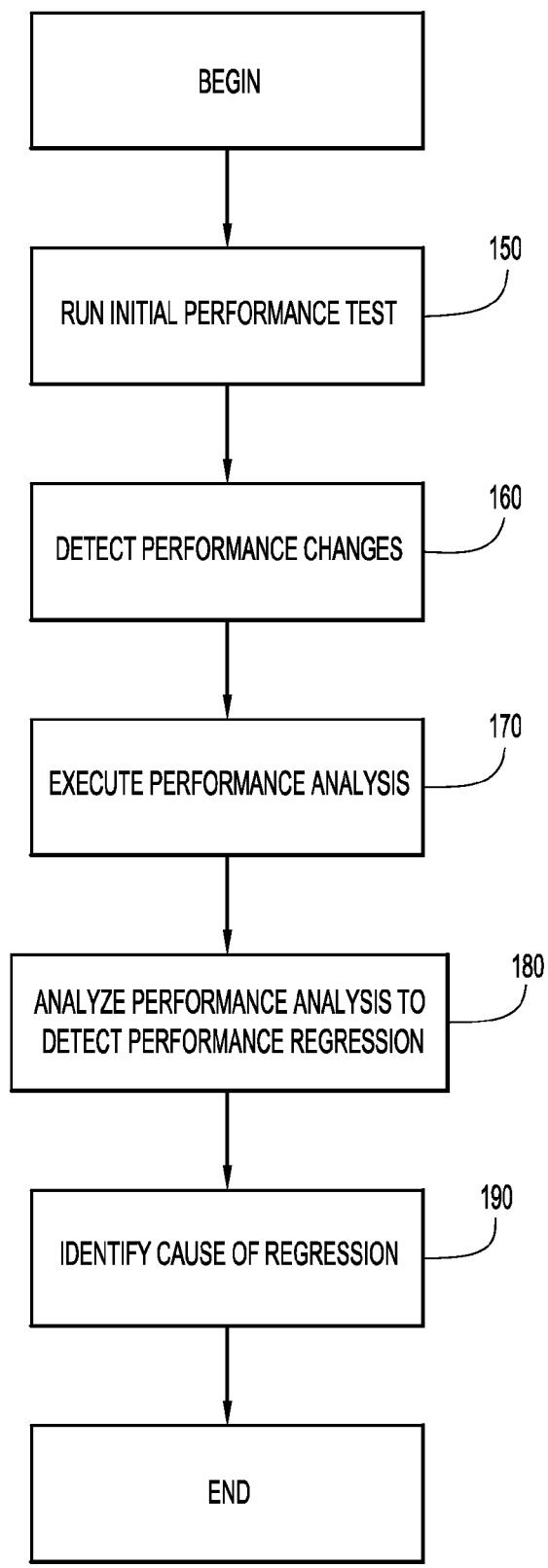
FIG. 2 is a procedural flow chart of an example regression detection method according to a present invention embodiment.

A manner of detecting regression (e.g. via regression detection module 122, server system 120 and/or client system 130) on a test system according to an embodiment of the present invention is illustrated in FIG. 2. Generally, an initial test is run in order to determine performance statistics of the test system. In some embodiments, the initial test run may be a single test, however, in other embodiments, the initial test may include multiple tests run over a specific period of time. Once the initial test has been run, subsequent tests may be run and compared to the initial tests. If regression is detected during any of the subsequent tests, the regression may be correlated with a specific change that caused the regression. Consequently, performance regression, and especially drastic performance regression, due to changes implemented during tests, such as source code changes or the environmental changes, can be detected and correlated with the changes to identify the correlated changes as candidate causes for the detected regression performance.

More specifically, at step 150, a first performance test is executed for at least one application. Performance metrics associated with this initial performance test can be measured and treated as a baseline moving forward. Consequently, if performance metrics of the application change in subsequent performance runs, perhaps caused by a change initiated or performed by a user or a change in the environment, the performance changes are detected at step 160. The changes may be stored and/or registered to regression detection module 122, which may execute a performance analysis suite at step 170 in order to analyze the measured performance metrics and detect an operational performance regression. In some embodiments, the list of jobs run during the entire performance testing is compared with the performance regression.

At step 180, the regression may be analyzed to correlate the detected operational performance regression with one or more changes made in the application. Then, at step 190 a root cause of the detected performance regression may be identified. For example, each job showing regression may be looked up and the changes associated with that job may be identified. In some embodiments, each job showing regression may be displayed with all associated change sets to determine whether the job is impacted, and if so, by what changes. Furthermore, in some embodiments, once identified, impacted elements of the computing environment may be altered in accordance with the identified changes to adjust operational performance.

Figure 3:
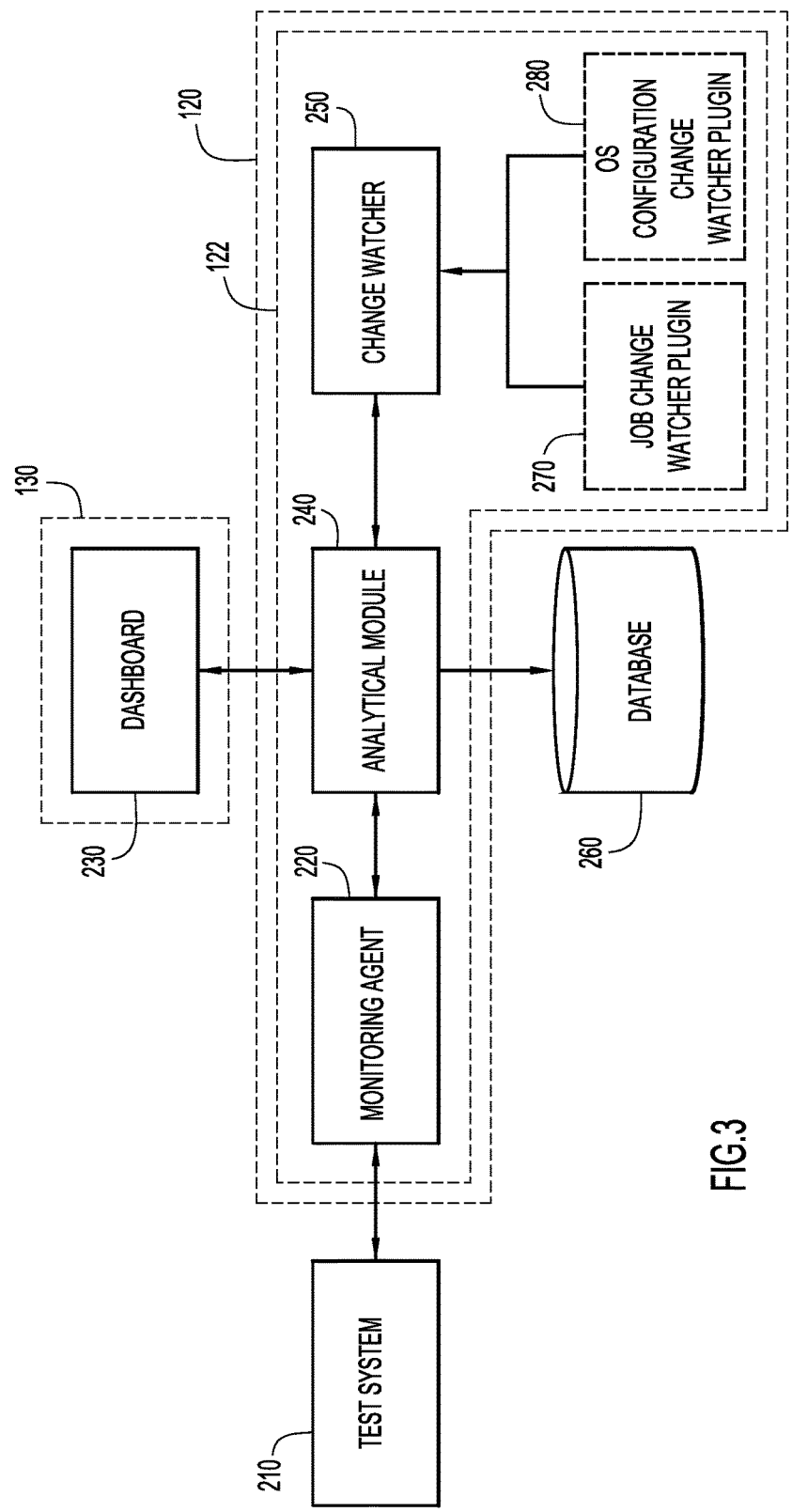
FIG. 3 illustrates a block diagram of an example regression detection module according to a present invention embodiment.

In FIG. 3, a block diagram illustrating a regression detection module 122 according to an invention embodiment is shown. The regression detection module 122 includes a monitoring agent 220, an analytical module 240, and a change watcher 250. Moreover, as briefly discussed with respect to FIG. 1, the regression detection module 122 may be hosted inside a server system 120 so that, for example, it can provide remote access to database 260 and web-based dashboard 230 of client system 130 for access to test case data and for trend analysis and performance problem investigation, respectively. The regression detection module 122 is also configured to interact with a test system 210.

The test system 210 is a controlled environment that runs predefined integration test cases generated by the regression detection module 122. In some embodiments, the test system 210 is a nightly test system that may be driven by a home grown script, Ant based JUnit test system, or a series of batch scripts that chain the testing target together. The test system 210 may be configured for any ongoing information integration project.

Figure 4:
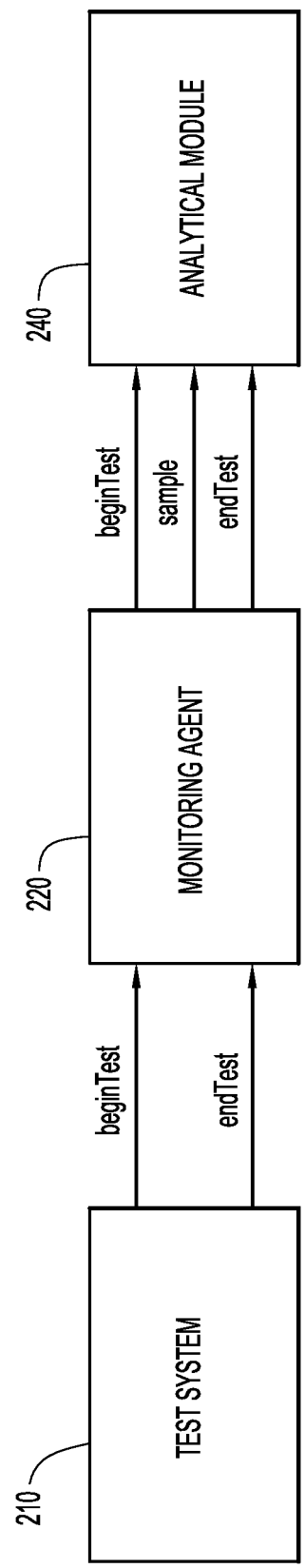
FIG. 4 illustrates an example communication protocol that may be utilized by a regression detection module of a present invention embodiment.

Still referring to FIG. 3, but with reference to FIG. 4 as well, the monitoring agent 220 is a component responsible for connecting the test system 210 to the analytical module 240 and for forwarding calls to register and unregister a test process with the analytical module 240. In some embodiments, the monitoring agent 220 may also be responsible for sending sample data to analytical module 240 so that the analytical module 240 can determine whether a test system 210 is performing as expected or is hanging. If the sample data is hanging or otherwise stalled, the analytical module 240 can present this data point to the dashboard 230.

FIG. 4 provides a flow chart illustrating the communication protocol of the test system 210, the monitoring agent 220, and the analytical module 240 is shown. The protocol includes "beginTest," "endTest," and "sample" messages and can be relayed from the test system 210 to the analytical module 240 via monitoring agent 220. The message "beginTest" notifies the monitoring agent 220 that a test case will be started and may pass at least the following information to the monitoring agent 220: Platform, TestCaseName, HostName, ProcessID, and StartTime. The monitoring agent 220 may forward this information to the analytical module 240 asynchronously. Similarly, the "endTest" message notifies the monitoring agent 220 that the test case has stopped and may pass at least the following information to the monitoring agent 220: Platform, TestCaseName, HostName, ProcessID, and EndTime. The monitoring agent 220 may also forward this information to the analytical module 240 asynchronously.

Still referring to FIG. 4, the "sample" message registers periodic sampling results of at least one of the CPU usage, memory usage, disk IO, and network IO usage to the analytical module 240 synchronously. The analytical module 240 will check total elapsed time to determine if this is a warning condition or a hang condition. If the analytical module 240 determines that a hang condition is present, the analytical module 240 will terminate the pending test case so that the test suite can move on to next test case.

In operation, once a test case starts to run, the test case calls an API to register with the monitoring agent 220. Then, when the test case finishes its own normal operation, it will also message monitoring agent 220 to unregister the process. The monitoring agent 220 will perform periodical sampling and may report at least one of the elapsed time, CPU usage, memory usage, disk IO usage and network IO usage for the corresponding process execution to the analytical module 240. Then, analytical module 240 performs analysis on the sample input to determine if the performance is within an acceptable range of variation, the performance is outside the acceptable range of variation and, therefore, is a regression situation, or the performance is in a hang situation and, thus, the test case needs to be terminated. If the analytical module 240 determines that the corresponding test case is hanging, it sends a signal to monitoring agent 220 to terminate corresponding test case so that the test bed can continue to execute the rest of the test cases.

Figure 5:
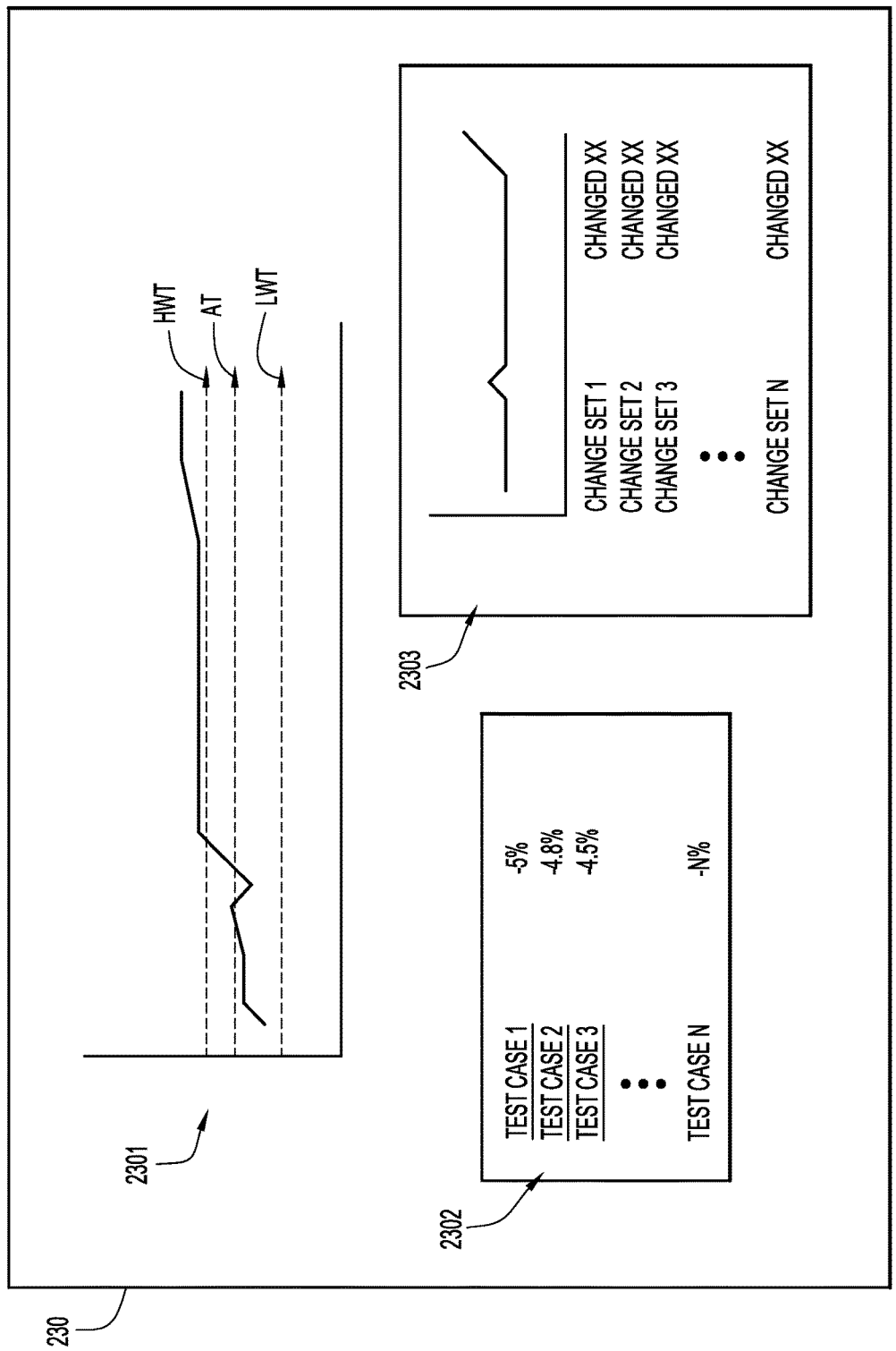
FIG. 5 provides a screenshot of an example dashboard for a regression detection module of a present invention embodiment.

Now referring to FIG. 5, but with continued reference to FIG. 3, one example screen shot of a dashboard 230 is shown. As can be seen in FIG. 5, in some embodiments, dashboard 20 includes a system trend graph 2301 showing a trend line of total execution time (represented on the Y-axis) versus Time (represented on the X-axis), a list 2302 of test cases running slow and, thus, likely experiencing performance regression, and a test case inset 2303. In the particular embodiment depicted in FIG. 5, the trend graph 2301 also displays an average execution time (AT), a high watermark for execution time (HWT), and a low water mark for execution time (LWT). As is discussed in detail with respect to FIG. 6, the values of the average execution time, the high watermark for execution time, and the low water mark for execution time may determined based on performance data from previous runs or may be directly specified by a user and, thus, in preferred embodiments, the values of these statistical measures are fixed over time. However, in other embodiments, these values could be determined as a function of time, if desired. Regardless, displaying these statistical measures on the trend graph 2301 may allow a user to easily detect possible regression. For example, if a trend line displayed on the trend graph 2301 crosses the high or low water mark for execution time, it may provide a visual indication to the user of possible performance regression.

In the embodiment depicted in FIG. 5, each of the test cases listed in list 2302 is interactive and when a user selects one of the listed test cases, the inset 2303 may display data specific to that test case, including a performance trend line graph and a list of change sets made during this test case. In this embodiment, line graphs are included in the dashboard 230 because any significant slope or variation in the line graph may clearly indicate a possible problem or performance regression, however, in other embodiment, the progression of the test cases may be represented in any desirable manner.

Notably, regardless of where the dashboard 230 is hosted, the dashboard 230 allows the user to review the overall statistics of the test system 210, such as the number of the test cases run and overall test case execution statistics, including test cases showing performance regression. The dashboard 230 may also allow a user to drill down from the overall test statistics to an individual test case and draw or view a trend line to connect, correlate, or otherwise relate various test cases with identified changes. Moreover, in some embodiments, the regression detection module 122 may allow a user to accept the change via the dashboard 230 and provide a comment/explanation. For example, if an intentional change is implemented, a user may accept the change and insert an appropriate comment. In some embodiments, accepted changes may be included or incorporated into the performance statistics associated with the initial test results. In other words, accepted changes may be factored into baseline statistics and the analytical module 240 may reflect this change and generate a new statistical profile for subsequent test cases to be compared to.

The dashboard 230 may also present an end user with a progress view of the running status of each test case so that an end user can find out which machines are running what test cases and how each running test case is progressing. In the event that the system detects that a test case is taking too long, such as in the manner described below with respect to FIG. 5, it may be flagged as a warning condition that warrants investigation. Alternatively or additionally, in the event that a test case hangs, such as in the manner also described below with respect to FIG. 5, it may be flagged in red so that the system administrator can focus on that specific test case. Moreover, the dashboard 230 can show a trend line of the overall test cases as well as a trend line for a specific test case, and if the trend line shows that a test case is taking longer and longer to run, it may serve as a sign of deterioration and warrant performance investigation.

Now referring again to FIG. 3, the change watcher 250 is responsible for detecting and tracking ongoing changes in the integration application and runtime environment. It provides a pluggable interface to support change registration. As shown in FIG. 3, the Change Watcher 250 may include a job change watcher plugin 270 and an Operating System configuration change watch plugin 280. The basic change registration interface can be as simple as the following:

```
public interface IChangeset
{
    /**
     * Register a changeset and a list of jobs affected by this changeset
     */
        public void registerChangeset(int changesetID,
String comments, List<String> affectedJobs);
    }
```

The information may be sent to the analytic module 240 in a table like this:

| ChangesetID | Comment | AffectedJob |
|---|---|---|
| 12345 | Change account range | ExtractMasterAccountsFrom |
| 12346 | Change transformer expression | FastCashCalculation |
| 12346 | Change transformer expression | FastLoad |
| 12346 | Change transformer expression | FastUnload |
| 12347 | Change default configuration file | SalesforceIntegrationV1 |
| . . . | . . . | . . . |

The job change watcher plugin 270 may run periodically against a source control system associated with an integration server to collect new change sets on the system. In operation, the change watcher plugin 270 identifies a list of new changes since its last refresh and checks, for each newly identified change set, to see which jobs are impacted. According to at least one invention embodiment, the change watcher plugin 270 may determine that a job is impacted in accordance with at least some of the following rules: (1) if a change is adding a stage to a specific job there is no global impact, so only that job is marked as impacted; (2) if a change is adding a stage to a shared container there is global impact, so all of the jobs that use the shared container are marked as impacted; (3) if a change is setting a new environment variable at a project level there will be a global impact to all the jobs in the project, so all of the jobs in the project are marked as impacted; (4) if a change is updating a job parameter specified at job level there is no global impact, so only that job is marked as impacted; and (5) if a change is updating a data type of a column in a table definition there is a global impact, so all of the jobs that use that table are marked as impacted.

In other embodiments, the change watcher plugin 270 may determine which jobs are impacted in any desirable manner. For example, change watcher plugin 270 may determine if a change has a global impact by utilizing a job design analytical system to evaluate changes in behavior introduced in particular jobs. The job design analytical system may analyze job models and list those jobs that would be impacted by completing the job, along with a severity of the impact (e.g. direct impact—critical, indirect impact—warning). In order to make this determination, the job design analytical system may analyze one or more features and criteria included in a job and extract the features from a job model representing the job by invoking a corresponding analytical rule for each feature. The analytical rule is associated with a severity and may include one or more operations. Invoking the analytical rule may perform the operations to analyze one or more job components associated with the corresponding feature as represented in the job model. Non-compliance of the rule provides the associated severity as an impact for the job. Several job models are analyzed to determine the jobs affected and the corresponding impact.

The OS change watcher plugin 280 may be responsible for collecting OS changes, such as: integration software patch installation, fix pack installation; OS patch, fix pack installation; OS file system change; and OS network configuration change. Those changes will also be registered to the same change tracking database and will be assumed to have global impact to all jobs until performance test run proves there is no negative impact and the user accepts the change.

Figure 6:
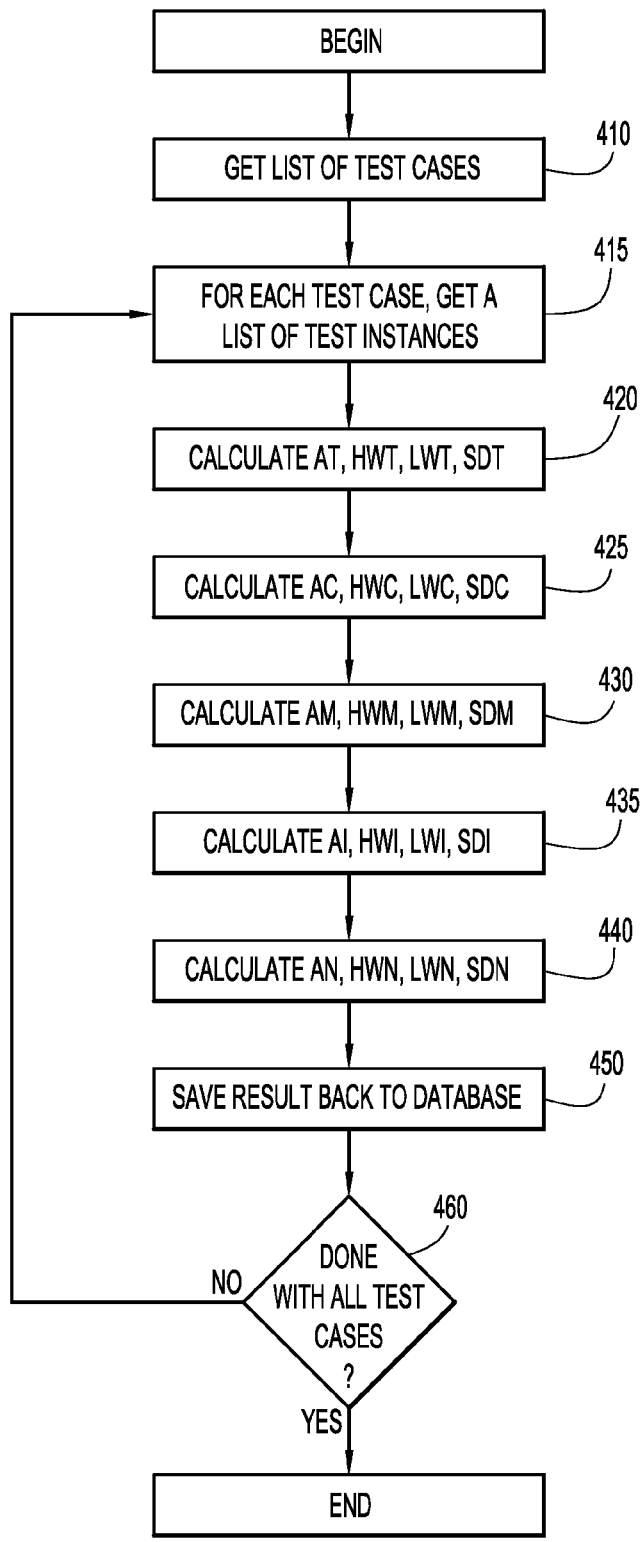
FIG. 6 is a procedural flow chart illustrating one example analysis of a test case that may be conducted by a present invention embodiment.
Figure 7:
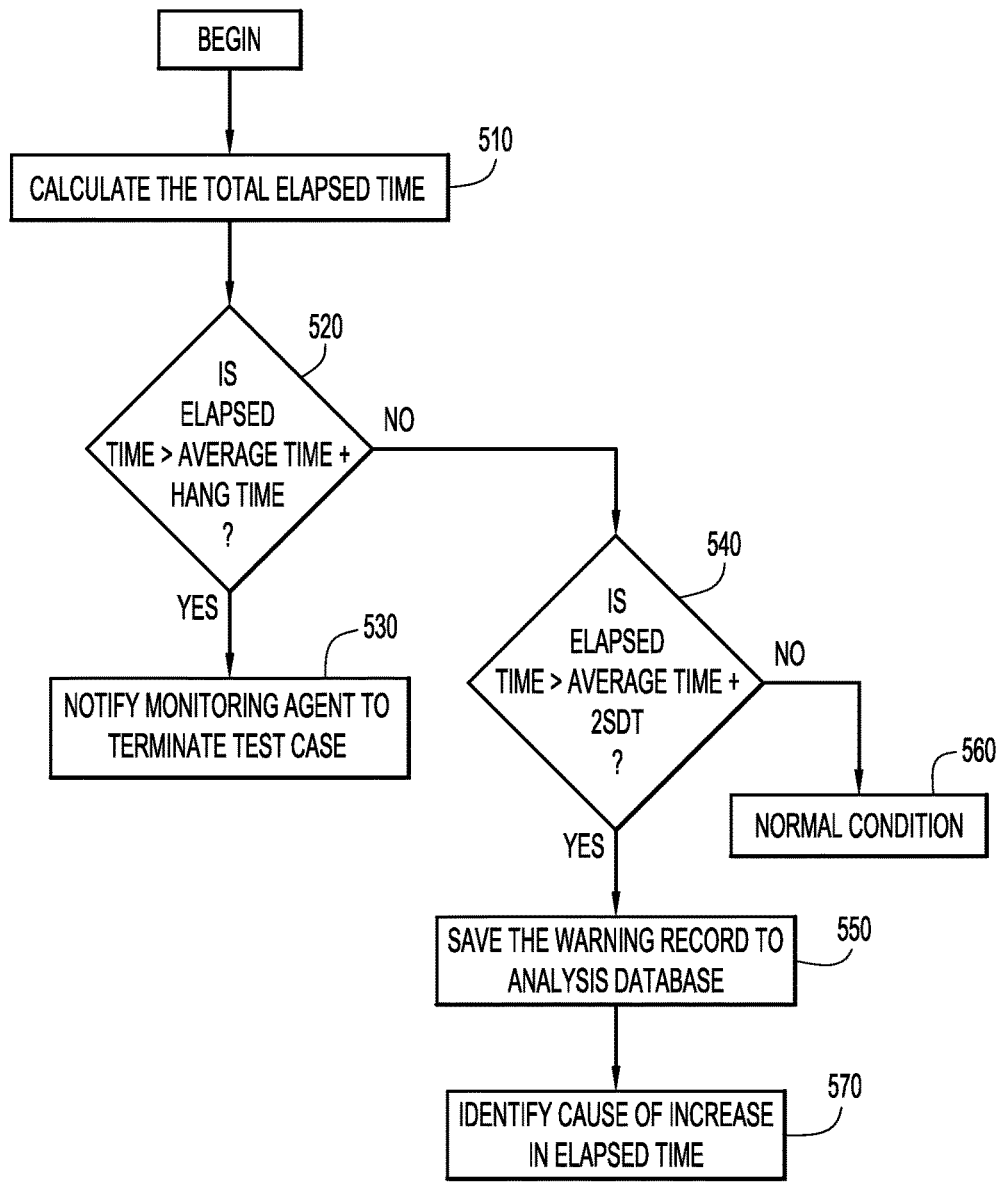
FIG. 7 is a procedural flow chart of one example analysis of variables to detect a performance regression that may be performed by a regression detection module of a present invention embodiment.

Now referring to FIGS. 2-3, but with reference to FIG. 6-7 as well, the analytical module 240 is a component of the regression detection module 122 that is responsible for processing registration/un-registration sampling requests from the monitoring agent 220. The analytical module 240 is also responsible for statistical analysis to determine if an operation is executing normally or abnormally. The analytical module 240 can also determine if an abnormal operation should cause a warning or error condition to be issued or indicated. In some embodiments, the analytical module 240 is configured to perform analysis and generate test case statistics, such as (1) average, (2) high water mark, (3) lower watermark, and (4) standard deviation value, for at least each of the following variables: total elapsed time; CPU usage; memory usage; disk IO usage; and network IO usage.

In some embodiments, the high and low water mark values may be the highest and lowest detected values. However, in other embodiments, the high and low water marks may be determined or established in accordance with user inputs. For example, a user may provide values or percentages that the high and low water marks can be based on. FIG. 6 provides a flow chart that illustrates a manner of determining the aforementioned values.

As shown, initially, at step 410, a list of test cases is acquired, perhaps from a database 260. Then, at step 415, a list of test instances for each test case is acquired. Once the list of test cases is acquired, statistical data can be calculated for each list of test instances in each test case at steps 420, 425, 430, 435, and 440, as is described below in detail. Then, at step 450 the statistical results can be saved to the database 260. If, at step 460, it is determined that all test cases have been analyzed, the analysis may end. However, if all test cases have not yet been analyzed, the procedures may be repeated starting from step 415. In some embodiments, the aforementioned steps are performed on all test data gathered during any run tests. However, in other embodiments, the monitoring agent 220 may send a sample of the data generated during testing to the analytical server 240 and statistics may be generated for the sample that are representative of the run tests.

In the embodiment illustrated in FIG. 6, the specific statistical analysis performed on each list of test instances for each case is as follows. First, at step 420 the total elapsed time is analyzed in order to calculate the average elapsed time (AT), high watermark of total elapsed time (HWT), low watermark of total elapsed time (LWT), and standard deviation of total elapsed time (SDT) for the list of test instances in each test case. Second, at step 425, the CPU usage is analyzed in order to calculate the average CPU usage (AC), high watermark CPU usage (HWC), low watermark CPU usage (LWC), and standard deviation of CPU usage (SDC) for the list of test instances in each test case. Third, at step 430, the memory usage is analyzed in order to calculate the average memory usage (AM), high watermark memory usage (HWM), low watermark memory usage (LWM), and standard deviation of memory usage (SDM) for the list of test instances in each test case. Fourth, at step 435, the disk IO usage is analyzed in order to calculate the average disk IO usage (AI), high watermark disk IO usage (HWI), low watermark disk IO usage (LWI), and standard deviation of disk IO usage (SDI) for the list of test instances in each test case. Fifth, and finally, the network IO usage is analyzed in order to calculate the average network IO usage (AN), high watermark network IO usage (HWN), low watermark network IO usage (LWN), and standard deviation of network IO usage (SDN) for the list of test instances in each test case.

In other embodiments, different statistical measures may be taken of the data. However, regardless of the statistical data produced, once the desired statistics have been generated by the analytical module 240, the analytical module 240 will perform at least one analysis to determine if the sampled test case is running normally. In some embodiments, the analytical module 240 may determine that the test case is running normal if: the elapsed time is within a normal range; the CPU usage is within a normal range; the memory usage is within a normal range; the disk IO usage is within a normal range; and the network IO usage is within a normal range.

In some embodiments, the normal range may be a predetermined range based on a baseline or initial test, but in other embodiments a normal range may be determined or altered with user inputs, predetermined criteria, or any other desirable factors. More specifically, in some embodiments, such as the embodiment shown in FIG. 7, the normal range may be considered two standard deviations from a baseline or initial test. However, in other embodiments, the normal range may be a range of percentages, perhaps linked to the baseline data, a range between the high and low water marks, or a user input range.

In contrast, the analytical module 240 may determine that an abnormal condition exists if at least one of the following is detected: the total elapsed time exceeds average time+ 2*standard deviation; CPU usage exceeds average usage+ 2*standard deviation; memory usage exceeds average usage+2*standard deviation; disk IO usage exceeds average usage+2*standard deviation; and network IO usage exceeds average usage+2*standard deviation. However, in other embodiments, any desirable criteria, with any desirable range or threshold may be implemented. Regardless, if an abnormal condition is detected, the analytical module 240 may create a record in database 260 to reflect this condition, and this condition will be pushed to the dashboard 230 so that an investigation may begin, perhaps by a system administrator or operational personnel.

FIG. 7 provides a flowchart illustrating a logic process used to evaluate a measured statistic in order to determine if that particular statistic is running normally. In particular, FIG. 7 shows a logic process for evaluating the measured elapsed time. First, at step 510, the total elapsed time is measured. At step 520, the measured time is compared to an average time plus a determined hang time. If the measured time is greater than the combination of the average time and the hang time, the monitoring agent 220 is notified, at step 530, to terminate the associated test case. For example, in embodiments where the monitoring agent 220 runs on the same machine as the test case, it can simply issue an OS specific call to terminate the test case. Specifically, on Unix/Linux, it can issue the call "kill-9<pid>" and on Windows, the monitoring agent may issue the call "taskkill/ f/pid<pid>." However, if the measured time is not greater than the combined average time and hang time, the measured time is compared to a two standard deviation range from the average time at step 540. If the measured time is within the range, the measured time is determined to be in a normal condition at step 560. If not, a record is saved to the database 260 at step 550 and the cause of the increase in elapsed time may be subsequently identified at step 570.

Regardless of the tests run, the database 260 may keep track of testing profiles over a predetermined set of time, such as 90 days. Alternatively, the database 260 may keep at least N releases worth of testing data in order to compare the performance evolution. For each test case, the raw performance data may be stored in a table that may provide at least some of the following data: a test case name, the OS platform on which the test case is executed, a test machine name (e.g., the host name that a test is executed on), a test instance ID, a total elapsed time, CPU usage, Memory usage, disk IO usage, network IO usage, and a process ID of the test case. Preferably, each test is given a unique name so that the each test is identifiable. Moreover, in preferred embodiments, the recorded usage data is an average usage of the CPU, Memory, disk IO, and network IO, respectively. However, in other embodiments, any desirable statistical measure of usage may be recorded if desired.

Consequently, when an abnormal condition is detected, such as an abnormal elapsed time at step 550, the regression associated with the abnormal condition may be compared to registered changes. Thus, for any jobs that cause performance regression, a recorded change may be correlated with the detected regression in order to identify the cause of the regression, such as the cause of the increase in elapsed time identified at step 570. A user may view this correlation via dashboard 230. Additionally or alternatively, the job with performance regression may be altered based on the identified cause in order to remove, fix, or otherwise change the step or portion of the job causing the regression. In other words, upon detection of performance regression, there is not simply an indication of regression but, instead, an indication of regression and the cause of that regression. Consequently, any performance regression can be quickly detected and remedied.

In some embodiments, changes that cause regression may be identified by associating the timestamp of the recorded changes with the timestamp of detected regression (or test case). When compared in this manner, a change that occurred just prior to detected regression may be determined to be the cause of the regression. Additionally or alternatively, in some embodiments, if regression is detected, any changes or change sets delivered between the last run (e.g., from the previous day) and the current run (e.g. from the current day) may be identified and viewed as the potential cause of the regression before additional identification steps are taken. In other words, if only one change or change set is detected in between two runs, that change or change set is identified as the cause of regression, but if multiple changes or change sets were applied, these changes or change sets may be identified as possible causes of regression and the changes may be further analyzed. For example, if an OS patch was applied or a file system was reconfigured in the past 24 hours and no other changes were made, the OS patch or file system reconfiguration would be identified as the cause of the detected regression, but if the OS patch was applied and the file system was reconfigured, both of these changes would identified as possible causes of regression and further steps would be taken to identify at least one of these two changes as the cause.

As an example of further analysis, in some embodiments, if a job hangs when a specific change is being made, this change may be determined to be the cause of the regression. As a more specific example, if a job uses a shared container and this container is changed to include a fork-join pattern, the job runs on multiple partitions. By comparison, if a job contains a shared container with a fork-join pattern in it and the job used to run on one partition, changing the parallel configuration file the job runs on from one partition to two partitions can trigger a hang. Consequently, the change may be determined to be the regression. However, in other embodiments, the change that causes the regression may be determined in any desirable manner.

It will be appreciated that the embodiments described above and illustrated in the drawings represent only a few of the many ways of implementing embodiments for detecting causes of performance regression to adjust data systems.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., test case data). The database system may be implemented by any number of any conventional or other databases, data stores or storage structures (e.g., files, databases, data structures, data or other repositories, etc.) to store information (e.g., test case data). The database system may be included within or coupled to the server and/or client systems. The database systems and/or storage structures may be remote from or local to the computer or other processing systems, and may store any desired data (e.g., test data and related statistics).

The present invention embodiments may employ any number of any type of user interface (e.g., Graphical User Interface (GUI), command-line, prompt, etc.) for obtaining or providing information (e.g., progress of the test cases), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. 1-7 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring performance regression comprising:
   recording one or more changes to a computing environment, wherein the computing environment includes at least one application, one or more jobs, and an operating system, and wherein recording one or more changes further comprises:
   periodically identifying and recording the changes; and
   determining one or more jobs impacted by the identified changes, wherein determining one or more jobs includes:
   determining that an identified change impacts a plurality of different jobs based on the identified change being associated with a shared object;
   identifying each job using the shared object as being impacted by the identified change; and
   identifying each job of the computing environment as being impacted by the identified change in response to the identified change being associated with the operating system;
executing the at least one application in the computing environment and measuring one or more performance metrics;
analyzing the measured performance metrics and detecting an operational performance regression;
correlating the detected operational performance regression with one or more recorded changes, wherein correlating the detected operational performance regression further comprises:
  determining one or more jobs associated with the detected operational performance regression; and
  obtaining the changes impacting the determined jobs to correlate the changes with the detected performance regression;
identifying a correlated change as a cause of the operational performance regression; and
adjusting execution of the determined jobs and operational performance of the computing environment to remedy the detected performance regression by altering steps of the determined jobs causing the detected performance regression indicated by the identified changes.

2. The method of claim 1, wherein the performance metrics include one or more from a group of: elapsed time, CPU usage, memory usage, disk input/output usage, and network input/output usage.

3. The method of claim 1, further comprising:
executing the at least one application in the computing environment to produce an initial baseline of performance metrics.

4. The method of claim 3, wherein the operational performance regression is detected based on a measured performance metric deviating in excess of a corresponding standard deviation from the initial baseline.

5. The method of claim 1, wherein the one or more changes include changes to one or more from a group of: elements of the computing environment, the at least one application, and the operating system.

6. A system for monitoring performance regression in a computing environment, the system comprising:
a processor configured to:
  record one or more changes to the computing environment, wherein the computing environment includes at least one application, one or more jobs, and an operating system, and wherein recording one or more changes further comprises:
    periodically identifying and recording the changes; and
    determining one or more jobs impacted by the identified changes, wherein determining one or more jobs includes:
      determining that an identified change impacts a plurality of different jobs based on the identified change being associated with a shared object;
      identifying each job using the shared object as being impacted by the identified change; and
      identifying each job of the computing environment as being impacted by the identified change in response to the identified change being associated with the operating system;
  execute the at least one application in the computing environment and measure one or more performance metrics;
  analyze the measured performance metrics and detect an operational performance regression;
  correlate the detected operational performance regression with one or more recorded changes, wherein correlating the detected operational performance regression further comprises:
    determining one or more jobs associated with the detected operational performance regression; and
    obtaining the changes impacting the determined jobs to correlate the changes with the detected performance regression;
  identify a correlated change as a cause of the operational performance regression; and
  adjust execution of the determined jobs and operational performance of the computing environment to remedy the detected performance regression by altering steps of the determined jobs causing the detected performance regression indicated by the identified changes.

7. The system of claim 6, wherein the performance metrics include one or more from a group of: elapsed time, CPU usage, memory usage, disk input/output usage, and network input/output usage.

8. The system of claim 6, wherein the processor is further configured to:
execute the at least one application in the computing environment to produce an initial baseline of performance metrics.

9. The system of claim 8, wherein the operational performance regression is detected based on a measured performance metric deviating in excess of a corresponding standard deviation from the initial baseline.

10. The system of claim 6, wherein the one or more changes include changes to one or more from a group of: elements of the computing environment, the at least one application, and the operating system.

11. A computer program product for monitoring performance regression in a computer environment, comprising a non-transitory computer-readable storage medium having computer-readable program code embodied thereon, the computer-readable program code, when executed by a processor, causes the processor to:
record one or more changes to the computing environment, wherein the computing environment includes at least one application, one or more jobs, and an operating system, and wherein recording one or more changes further comprises:
  periodically identifying and recording the changes; and
  determining one or more jobs impacted by the identified changes, wherein determining one or more jobs includes:
    determining that an identified change impacts a plurality of different jobs based on the identified change being associated with a shared object;
    identifying each job using the shared object as being impacted by the identified change; and
    identifying each job of the computing environment as being impacted by the identified change in response to the identified change being associated with the operating system;
execute the at least one application in the computing environment and measure one or more performance metrics;
analyze the measured performance metrics and detect an operational performance regression;
correlate the detected operational performance regression with one or more recorded changes, wherein correlating the detected operational performance regression further comprises:

determining one or more jobs associated with the detected operational performance regression; and obtaining the changes impacting the determined jobs to correlate the changes with the detected performance regression;

identify a correlated change as a cause of the operational performance regression; and adjust execution of the determined jobs and operational performance of the computing environment to remedy the detected performance regression by altering steps of the determined jobs causing the detected performance regression indicated by the identified changes.

12. The computer program product of claim 11, the computer-readable program code being further configured to cause the processor to:

execute the at least one application in the computing environment to produce an initial baseline of performance metrics, wherein the performance metrics include one or more from a group of: elapsed time, CPU usage, memory usage, disk input/output usage, and network input/output usage.

13. The computer program product of claim 12, wherein the operational performance regression is detected based on a measured performance metric deviating in excess of a corresponding standard deviation from the initial baseline.

14. The computer program product of claim 11, wherein the one or more changes include changes to one or more from a group of: elements of the computing environment, the at least one application, and the operating system.

* * * * *